United States Patent
Krishnamurthy et al.

[19]

[11] Patent Number: 5,828,404
[45] Date of Patent: Oct. 27, 1998

[54] VSB MODE DETECTION SYSTEM WITH COMB FILTER

[75] Inventors: Gopalan Krishnamurthy, Wheeling; Rudolf Turner, Hawthorn Woods, both of Ill.

[73] Assignee: Zenith Electronics Corporation, Glenview, Ill.

[21] Appl. No.: 661,241

[22] Filed: Jun. 10, 1996

[51] Int. Cl.[6] .................................................. H04N 5/38
[52] U.S. Cl. ............................ 348/21; 348/607; 348/470
[58] Field of Search ............................... 348/21, 607, 608, 348/64, 613, 470; H04N 5/38

[56] References Cited

U.S. PATENT DOCUMENTS

| | | | |
|---|---|---|---|
| 5,546,132 | 8/1996 | Kim et al. | 348/607 |
| 5,594,496 | 1/1997 | Nielsen et al. | 348/27 |
| 5,602,602 | 2/1997 | Hulyalkar | 348/607 |

*Primary Examiner*—Victor R. Kostak

[57] ABSTRACT

A VSB mode detection circuit with a comb filter solves the potential problem of lockout in a situation where an 8 VSB mode signal is being received, with the comb filter being effective, and a change in signal mode suddenly occurs. The arrangement inhibits the first two bytes of the three byte mode information, which two bytes are unspecified for all except the 8 VSB terrestrial mode, and replaces them with zero data. In another embodiment, the 12 symbol delay in the comb filter is bypassed with the complement of the input data for the third byte. When the 8 VSB terrestrial mode has been confidently determined to exist, the inhibition of the first and second bytes (and the inversion of the bypassed third byte) is removed in alternate fields to permit normal comb filter operation.

9 Claims, 2 Drawing Sheets

VSB MODE DETECTION SYSTEM WITH COMB FILTER

BACKGROUND OF THE INVENTION AND PRIOR ART

This invention relates to advanced television systems and in particular to VSB (vestigial side band) mode detection in a receiver having a comb filter to reject NTSC co-channel signals. The digital television signal standards specifies that the VSB mode be defined in three bytes of data during the 24 symbols of the 832 symbol field sync segment. For the 8 VSB terrestrial standard signal, these three mode information bytes are fully specified. However, for other transmission modes such as 16 VSB, only the third byte of the three bytes is specified and the first two bytes are reserved. Thus two of the three mode information bytes are unknown for most VSB modes. Consequently, a digital receiver cannot use a comb filter for VSB mode detection except for the 8 VSB terrestrial transmission mode. Since the comb filter enhances NTSC co-channel interference rejection, it is highly desirable to use the comb filter to detect the VSB mode during reception of 8 VSB terrestrial signals in the presence of NTSC co-channels. However, if the comb filter is effective and a change in VSB mode of the received signal suddenly occurs, the mode detection circuitry of the receiver may be unable to determine the mode of the new signal due to the action of the comb filter and lockout may occur. This is because the comb filter modifies the values in the third byte by subtracting data present in the first two bytes, as will be described. The invention solves this problem and enables the use of the comb filter for reception of 8 VSB terrestrial signals while retaining the ability to mode detect other VSB mode signals.

OBJECTS OF THE INVENTION

A principal object of the invention is to provide a novel VSB mode detection system for an ATV (advanced television) receiver.

Another object of the invention is to provide improved mode detection in ATV receivers using comb filters.

A further object of the invention is to provide an improved ATV receiver.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

In the comb filter of the ATV standard, data is supplied to the positive input of an adder and through a 12 symbol delay to the negative input of the adder. Thus, symbol #1 is subtracted from symbol #13, symbol #2 from symbol #14, etc. The output of the adder is applied to a mode detector where a comparison is performed between the incoming symbols and a known reference pattern for determining the VSB mode information. As discussed above, for the 8 VSB terrestrial mode, when all three of the mode bytes are specified, the benefits of NTSC co-channel signal interference rejection are obtained. When the comb filter is in use, a change of signal to a different VSB mode (or to a different signal type) will result in the information generated by the comb filter and applied to the mode detector being unpredictable and the mode detection circuitry will be incapable of determining the signal mode. This is because in such signals, the first two modes are not specified and the data will be garbled.

The invention solves the above-described problem and retains the benefits of using a comb filter for receiving 8 VSB terrestrial signals while enabling the ATV receiver to detect the mode of other signals should such be received while the comb filter is effective. Two different aspects of the invention will be described, both of which initially render the comb filter ineffective until it is determined that the received signal is 8 VSB. In that event, the comb filter is caused to operate normally in alternate fields of the received signal.

Figure 1:
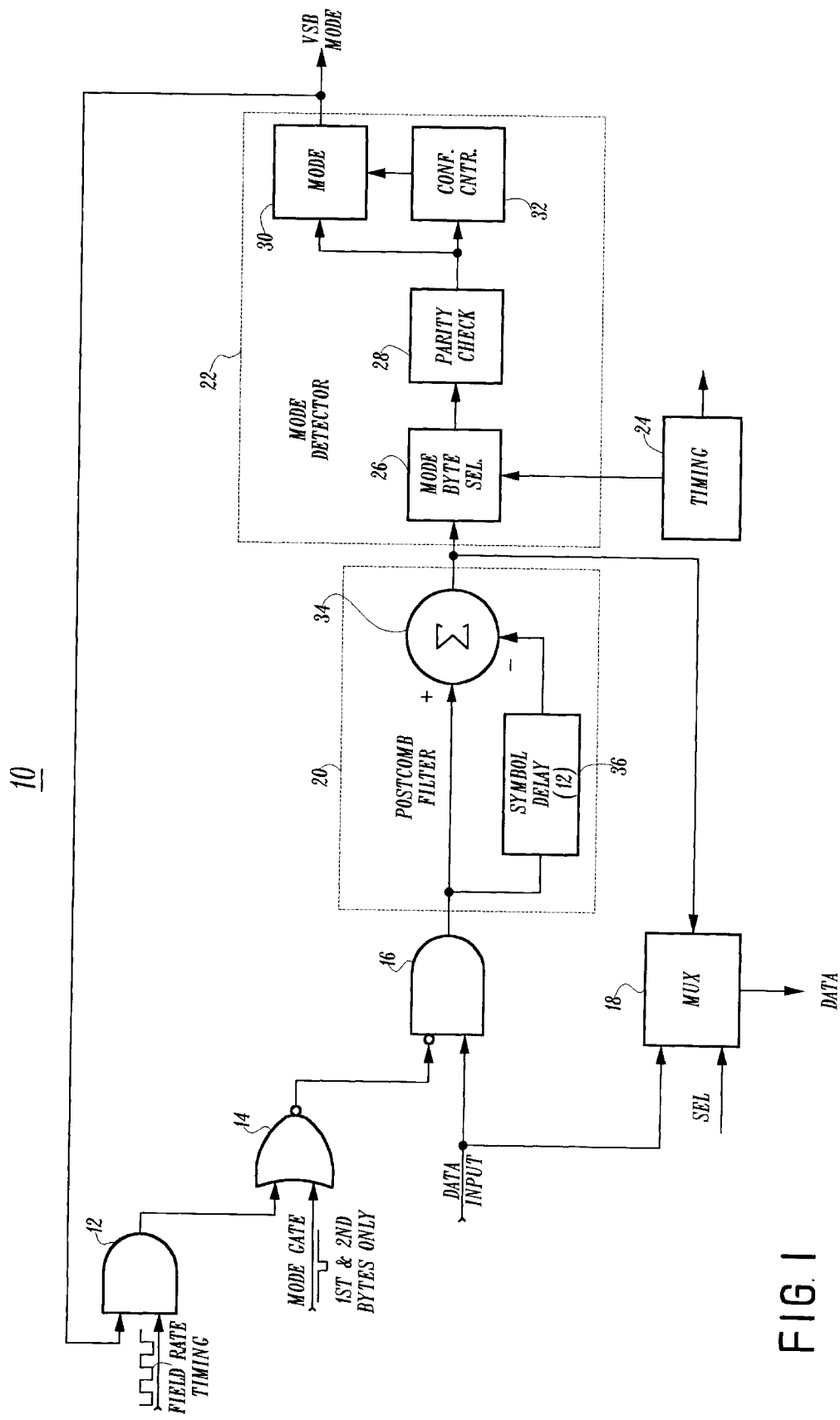
FIG. 1 is a partial block diagram showing one form of the invention.

In the first aspect, the initial two bytes of the three byte mode information are zeroed out before they are supplied to the comb filter. The arrangement is illustrated in FIG. 1. The receiver 10 (partially shown) includes an AND gate 12 that is supplied with a field rate timing signal and with the detected VSB mode signal that goes high for the 8 VSB mode. The output of AND 12 is supplied to one input of a NOR gate 14, the other input of which is supplied with an active low mode gate signal that corresponds to the first and second bytes of the three byte mode information. The output of NOR 14 is applied to an inhibit input of an AND gate 16, the other input of which is supplied with the signal data. The output of AND 16 is coupled to the input of a comb filter 20 that includes an adder 34 and a 12 symbol delay 36. The output of comb filter 20 is coupled to a mode detector 22 that includes a mode byte selector 26, a parity checker 28, a confidence counter 32 and a mode output circuit 30 which provides the detected VSB mode signal. A timing circuit 24 supplies timing signals as required. The received signal input data is also supplied to a multiplexer 18, the other input of which is supplied from the output of comb filter 20. A select signal operates multiplexer 18 for supplying the received signal data to the remainder of the receiver (not shown). The select signal is operated by circuitry (not shown) that determines whether the comb filter is needed, i.e. whether NTSC co-channel interference exists. If NTSC co-channel interference is not present, it is desirable to bypass the comb filter because it does introduce 3 dB of threshold degradation against white noise.

When AND 16 is inhibited, the data value of its output becomes zero. This occurs during the first and second bytes of the mode information due to the mode gate signal applied to NOR 14. Therefore, when the output of NOR 14 is high, it is translated into a low due to the negative input to AND 16 and forces the output of AND 16 low. The mode gate signal supplies a low to one input of NOR 14 during the first and second mode information bytes. AND 12 is inhibited except when the VSB mode signal is high which occurs when confidence is attained with a received 8 VSB signal. When such confidence is attained, AND 12 is enabled and the field rate timing signal, with alternating highs and lows, is applied to the input of NOR 14 which results in AND 16 passing the first two bytes of mode data to comb filter on alternate fields. In this manner, the benefits of comb filter operation are retained for 8 VSB terrestrial signals.

If the data field sync symbol amplitudes are +1 and −1, the comb filter 20 generates values of +2, 0 or −2 at its output. During the third mode byte, the comb filter output will be +2 or −2 (with no zeros) for the 8 VSB mode if the first two bytes are not inhibited and +1 or −1 (with no zeros) for any other situation if the first two bytes are inhibited. The +1 and −1 output will have no adverse effect on other circuitry in most instances. While the technique does not help the initial acquisition of 8 VSB terrestrial mode signals under heavy NTSC co-channel interference, it does resist loss of lock. Retaining the inhibit function on alternate segments prevents a lockout condition occurring if for any reason the 8 VSB mode is selected either falsely or if a signal mode change occurs. If the 8 VSB terrestrial mode is in effect and the first two mode bytes are allowed to pass through the comb filter, other modes cannot be detected because of the comb filter action and the confidence counter 32 will not count down which will result in a lock condition. By always inhibiting the first two mode bytes on alternate fields, other modes can be detected even when the receiver is in the 8 VSB mode thus preventing lockout.

Figure 2:
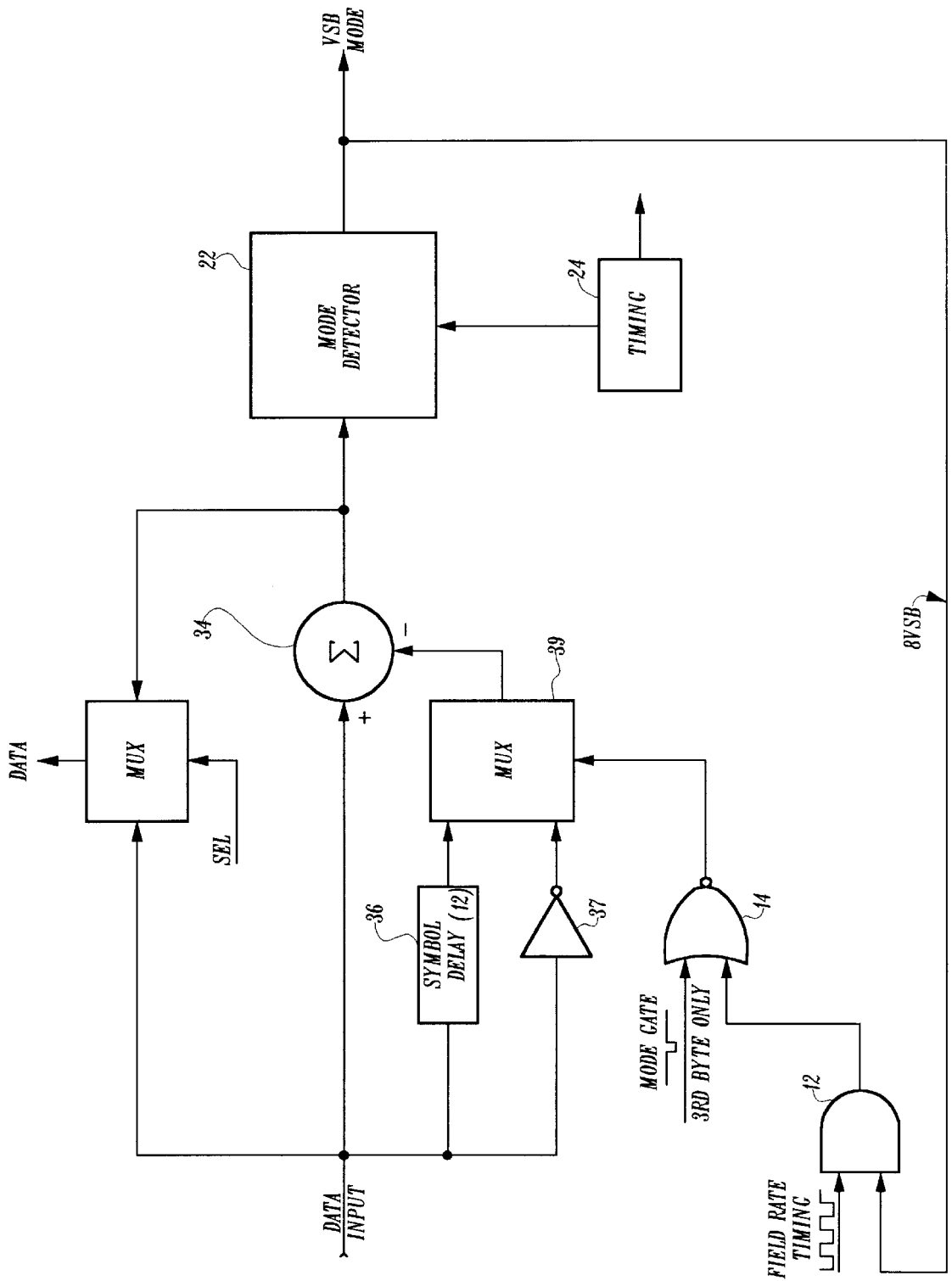
FIG. 2 is a partial block diagram illustrating another form of the invention.

In FIG. 2, the delayed data, i.e. the data through symbol delay 36, is replaced with the complement of the data during the third byte of the mode information. Hence the subtraction will occur in adder 34 and will result in +2 or −2. This is the same as when the comb is operating normally and achieves the +1, −1 output of the previous version. Here again, when the 8 VSB terrestrial mode has been detected with confidence, the VSB mode signal will go high and enable AND 12 which will apply alternate field timing signals to the input of NOR 14 for operating multiplexer 39 to select the signal through symbol delay 36 or the signal through inverter 37 for application to adder 34. Thus the circuit will operate as discussed above with full comb filter action on alternate half cycles when the 8 VSB terrestrial mode is in effect and in other situations, it will preclude a lockout condition due to an inability of detecting other modes.

With the invention, the benefits of NTSC co-channel interference rejection are retained while giving the ATV receiver the ability to automatically detect other signal modes.

It is recognized that numerous changes in the described embodiment of the invention will be apparent to those skilled in the art without departing from its true spirit and scope. The invention is to be limited only as defined in the claims.

What is claimed is:

1. A method of determining the mode of a received VSB digital signal with a receiver that includes a comb filter for reducing NTSC signal interference comprising:

continually sampling the mode information in one field of the digital signal with the comb filter being effective; and continually sampling the mode information in the other field of the digital signal with the comb filter being ineffective.

2. The method of claim 1 wherein the mode information comprises a three byte series with the third byte being specified for all VSB modes and the first two bytes being specified for one VSB mode and unspecified for the remaining VSB modes and wherein the three mode information bytes are processed differently in each of the two fields of the digital signal.

3. The method of claim 2 wherein the processing of the mode information bytes comprises:

in one field, passing the three bytes through the comb filter; and in the other field, setting the value of the first two bytes to zero before passing the three mode bytes through the comb filter.

4. The method of claim 2 wherein the processing of the mode information bytes comprises:

in one field, passing the three bytes through the comb filter; and in the other field, bypassing the delay in the comb filter while sampling only the third byte of the mode information.

5. In a receiver for receiving digital VSB signals including VSB mode information:

a comb filter, including a 12 symbol delay, for reducing NTSC co-channel interference;

means for continually sampling said VSB information in one field of said digital signal with said comb filter being effective; and means for continually sampling said VSB mode information in the other field of said digital signal with said comb filter being ineffective.

6. The receiver of claim 5 wherein said mode information comprises a three byte series with the third byte being specified for all VSB modes and the first two bytes being specified for one VSB mode and unspecified for the remaining VSB modes and wherein the three mode information bytes are processed differently in each of the two fields of the digital signal.

7. The receiver of claim 6, further comprising:

means for passing said three bytes through said comb filter in one of the fields of said digital signal; and means for setting the value of said first two bytes to zero before passing said three mode bytes through said comb filter.

8. The receiver of claim 6, further comprising:

means for passing said three bytes through said comb filter in one of the fields of said digital signal; and means for bypassing said symbol delay in said comb filter while sampling only the third byte of said mode information in the other field of said digital signal.

9. The receiver of claim 8, wherein said comb filter includes an inverter coupled to one end of said symbol delay and further including;

a multiplexer coupled to the other ends of said symbol delay and said inverter; and means for operating said multiplexer to select said symbol delay and said inverter on alternate ones of said fields of said digital signal.

* * * * *